April 10, 1962  A. HEINZ  3,029,348
ELECTRO-OPTICAL SERVO SYSTEM FOR COARSE AND
FINE POSITIONING OF TRANSISTORS
Filed Oct. 2, 1959  4 Sheets-Sheet 1

INVENTOR
A. HEINZ
BY
Albert R. Hodges
ATTORNEY

April 10, 1962 A. HEINZ 3,029,348
ELECTRO-OPTICAL SERVO SYSTEM FOR COARSE AND
FINE POSITIONING OF TRANSISTORS
Filed Oct. 2, 1959 4 Sheets-Sheet 3

INVENTOR
A. HEINZ
BY
Albert R. Hodges
ATTORNEY

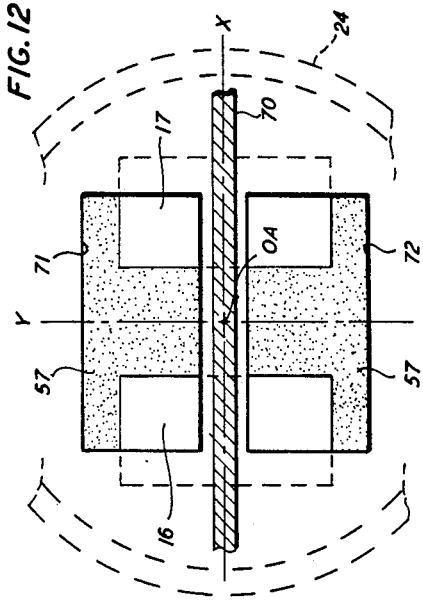
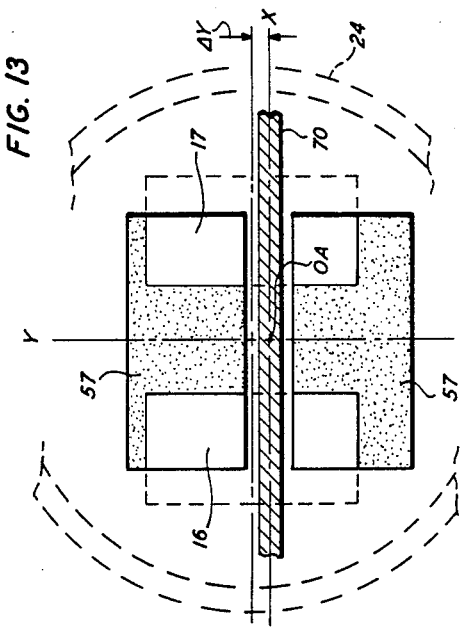
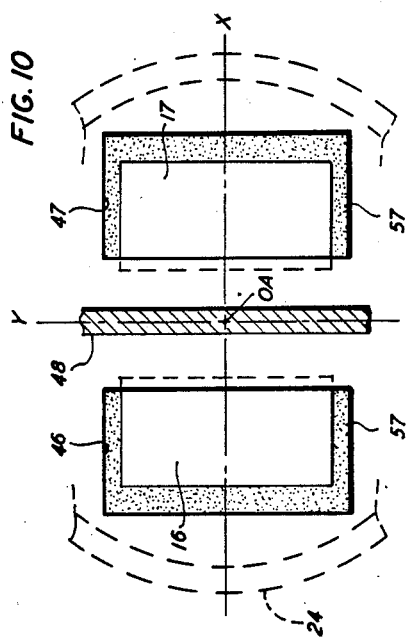
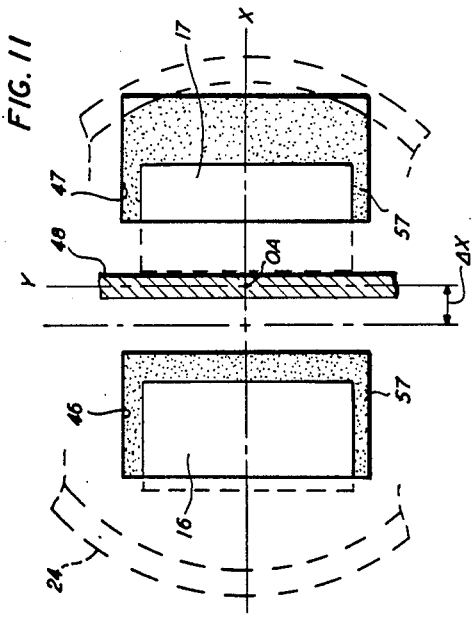
INVENTOR
A. HEINZ
BY *Albert R. Hodges*
ATTORNEY

United States Patent Office 3,029,348
Patented Apr. 10, 1962

3,029,348
ELECTRO-OPTICAL SERVO SYSTEM FOR COARSE AND FINE POSITIONING OF TRANSISTORS
Alfred Heinz, Flemington, N.J., assignor to Western Electric Company, Incorporated, New York, N.Y., a corporation of New York
Filed Oct. 2, 1959, Ser. No. 843,960
11 Claims. (Cl. 250—221)

This invention relates to means for automating the operation of bonding conductive leads to semiconductive devices, and more particularly to an electro-optical servo system which accurately positions a semiconductive device relative to a bonding station.

The small size of semiconductive devices has complicated the task of completely mechanizing their production. At present, the "automatic" manufacture of transistors, for example, is interrupted by a number of laborious manual steps. A particular difficulty lies in the bonding of conductive leads to the semiconductive devices.

In the prior art, a portion of this difficulty arose from the lack of continuous control over the conductive leads. The invention of R. P. Clagett described in copending patent application Serial No. 821,444, filed June 19, 1959, and assigned to the assignee of the present application has eliminated this problem. Complete automation of the bonding operation was not realized, however, due to the fact that an operator utilizing a microscope was still required to accurately position the semiconductive device relative to the bonding tool employed. In the typical bonding operation, conductive leads finer than a human hair must be bonded to metallic stripes which are normally 2 mils x 4 mils in size. The accuracies required, therefore, presented a major obstacle to the mechanization of the positioning portion of the bonding operation.

An object of the invention is to provide new and improved means for automating the operation of bonding conductive leads to semiconductive devices.

A further object of the invention is to provide new and improved means for accurately and automatically positioning a semiconductive device relative to a bonding station.

To these ends, the invention provides an electro-optical servo system which utilizes contrasting areas in terms of light reflection for deriving accurate positioning information. An apparatus illustrating certain aspects of the invention may comprise a microscope adapted to produce an enlarged image including such contrasting areas, at least two photoelectric elements, means for projecting a different portion of the image onto each element respectively, the amount of light projected onto each element when the contrasting areas are in a selected location being established as a reference norm, each element being adapted to produce an electrical signal which is a function of the amount of light incident thereon, so that displacement of the contrasting areas from the selected location produces variation in the signal outputs of the photoelectric elements from an electrical reference norm corresponding to the light reference norm, and servo means for moving the contrasting areas into the selected location in response to variation of the electrical signal outputs from their reference norm.

A complete understanding of the invention may be obtained from the following detailed description of means forming specific embodiments thereof, when read in conjunction with the appended drawings, in which:

FIGS. 10–13 are enlarged images of properly and improperly positioned metallic stripes as they appear within a transducer compartment.

Figure 1:
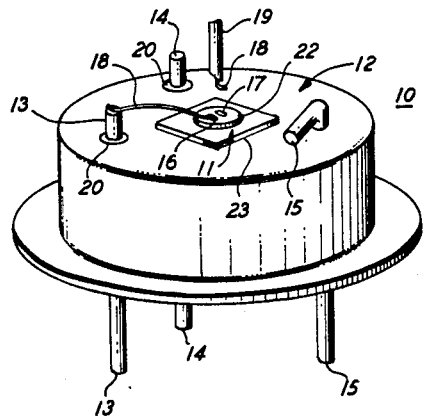
FIG. 1 is a perspective view of a typical three-element transistor with its cover removed.

Though applicable to semiconductive devices in general, the invention will be described as it is applied to a three-element transistor 10 shown in FIG. 1. The transistor 10 includes a semiconductive wafer 11 mounted upon a body portion 12. As may be seen in FIG. 5, the semiconductive wafer 11 is divided into three regions known as the base, emitter and collector. These regions are individually connected to circuitry external to the transistor by means of a base terminal 13, an emitter terminal 14, and a collector terminal 15. Thus, each region must be electrically connected to its associated terminal. Ordinarily, one of the regions of a transistor, the collector for example, is grounded. This region may, therefore, be directly connected to the body portion 12 of the transistor, whereupon the collector terminal 15 need only be joined to the body portion 12 in order to be connected to the collector region.

The electrical connection of the emitter and base regions to their respective terminals, however, is not so readily effected. Ordinarily, a separate metallic stripe, which may be of aluminum, is sputtered onto each of these regions to form a terminal surface. In the case of the wafer 11, a metallic stripe 16 is sputtered onto the base region and a metallic stripe 17 is sputtered onto the emitter region. These metallic stripes, normally 2 mils x 4 mils in size, are electrically connected by means of extremely fine leads, normally of gold, to their respective terminals 13 and 14 which are insulated from the body portion 12 by means of insulating sleeve 20.

In FIG. 1, the metallic stripe 16 is shown connected to its terminal 13 by means of a lead 18 which may have a diameter of 1 mil, for example. To form this connection, the conductive lead 18 must be bonded to the metallic stripe 16 and to the terminal 13. In the Clagett system described in the above-mentioned application, such bonding is accomplished by means of a tool which forms, for example, thermocompression bonds while exercising complete control over the conductive lead. Only a portion of this tool is shown in FIG. 1. The portion shown comprises a tube 19 through which the conductive lead 18 is fed.

In the operation of the tool, the conductive lead is bent under an edge of the tube. The tube is then moved to a bonding location above the metallic stripe 16, for example, and lowered so as to press the lead 18 against the metallic stripe 16 to form the bond. The tube is then moved to a location above the terminal 13 where the bonding operation is repeated.

The above description illustrates that an important requirement in a bonding operation is the accurate location of the bonding tool employed. This requirement is applicable to all bonding systems in general, the Clagett system having been described only by way of example. It will be appreciated that the minute dimensions involved present a major obstacle to the automation of this location function and, therefore, to complete mechanization of the bonding operation in transistor manufacture.

Figure 2:
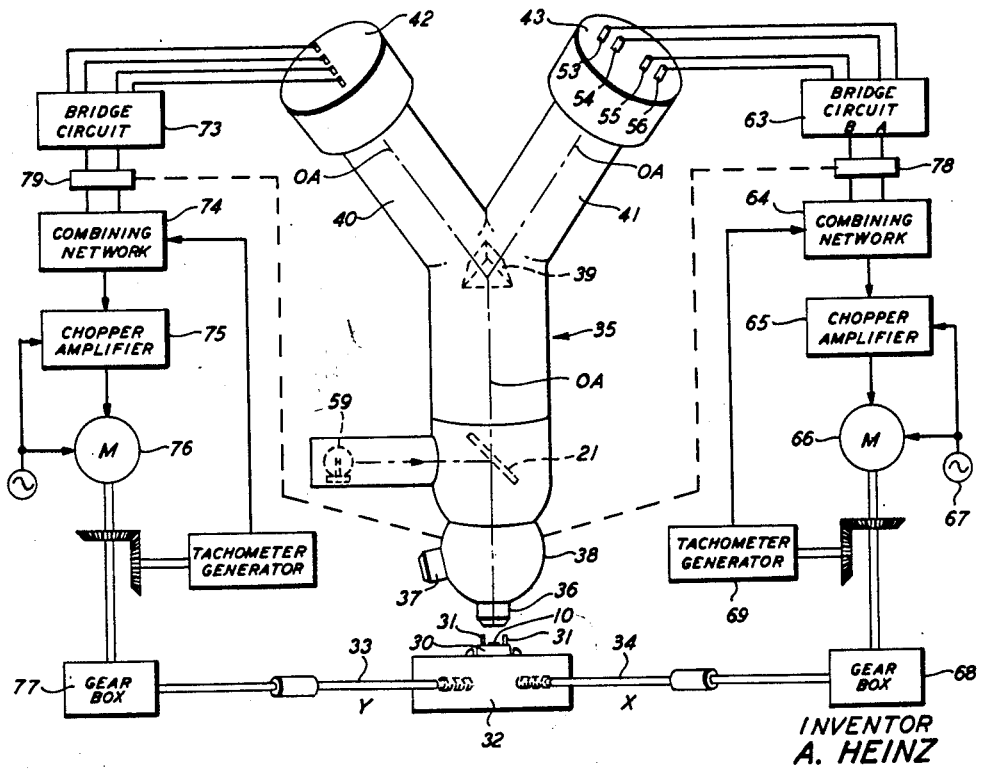
FIG. 2 is a schematic, partly in block form, of an electro-optical servo system forming one embodiment of the invention.

FIG. 2 illustrates an electro-optical servo system in accordance with the invention whereby the location function within a bonding operation may be automated. In this system, the transistor 10 is placed within an accommodating well 30 and held in place by means of clamping fingers 31 which engage a flange on the body portion 12. In turn, the well 30 is securely held in a preselected position by means of a chuck 32. The chuck 32 is adapted so that it may be translated in either a Y or X direction by the rotation of shafts 33 and 34, respectively, which shafts are threaded into the chuck 32 for this purpose.

The servo system of FIG. 2 includes a microscope, shown generally at 35. The microscope 35 has a lower magnification objective lens 36 and a higher magnification objective lens 37 mounted on a swivel turret 38. In this way, the lens 36 may be substituted for the lens 37, so that the microscope may be switched from a lower to a higher magnification lens system, respectively, by swivelling the turret 38. In either event, the lens system chosen is adapted by means of a prism 39, to project an enlarged image of the object being viewed into a Y eyepiece 40 and into an X eyepiece 41. Illumination of the object being viewed is provided by light rays from a source 59 which are reflected from a mirror 21 through the selected objective lens.

The eyepieces 40 and 41 are surmounted by compartments 42 and 43, respectively. Each of these compartments acts as a transducer for converting light from the image projected into its associated eyepiece into electrical signals. These signals are then applied to an electrical servo network which converts them into mechanical motion for positioning the chuck 32.

Figure 3:
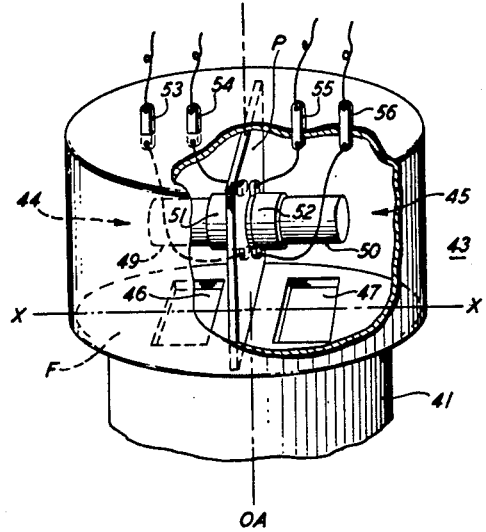
FIG. 3 is a partially cut-away perspective view of a transducer compartment forming part of the system of FIG. 2.

The operation of this electro-optical servo system depends upon the extraction, from the enlarged images produced by the microscope, of positioning information which may be converted into identifiable electrical signal parameters, such as magnitude and polarity, for properly directing the mechanical output of the servo network. In the embodiment of FIG. 2, this function is effected within the compartments 42 and 43. In FIG. 3, only the compartment 43 is shown in detail since the compartment 42 is of substantially the same construction. The compartment 43 is divided into two sections, shown generally at 44 and 45. The compartment is substantially lightproof except for the presence in each section of a window, 46 and 47 respectively, opening onto the eyepiece 41. The windows 46 and 47 are advantageously identical rectangles which are symmetrically positioned to either side of imaginary plane P disposed parallel to a selected rectangle side. Plane P is arranged so that the optical axis OA of the microscope lies therewithin. Furthermore, the windows are symmetrically disposed along an imaginary line X intersecting the optical axis OA and perpendicular to the plane P, the line X being positioned in a plane F perpendicular to the optical axis. In this way, light from a different portion of the image projected into the eyepiece 41 passes through each window, respectively. A section wall 48 coincident with the imaginary plane P is provided to prevent interference of the light within the section 44 with that within the section 45.

The light passing into each section is converted into an electrical signal by means of an identical photoelectric element, 49 and 50 respectively, for each window. Each of these photoelectric elements is supported by means of a socket, 51 and 52 respectively, and disposed so that the light passing through its associated window is projected thereon. The photoelectric elements employed in this embodiment are each adapted to produce an electrical current at their terminals, 53 and 54, 55 and 56, respectively, the magnitude of which is a function of the amount of light incident on the element. Such devices may be of either vacuum tube, gas-filled tube, or semiconductor construction. The latter form is preferred because its small size permits complete utilization of its photosensitive area and therefore optimum efficiency, without the production of an inordinately large image. The resultant permissible use of lower magnification lens systems increases the working distance of the microscope, while the efficient utilization of all the light provided permits the use of a relatively low-power light source.

It should be noted that current-producing photoelectric elements are merely exemplary of the type of device which may be employed. Any device capable of producing an electrical signal which is a function of the amount of light incident thereon may be substituted for the devices of the instant embodiment. For example, voltage-producing photoelectric elements or photosensitive resistors are satisfactory substitutes.

Figure 5:
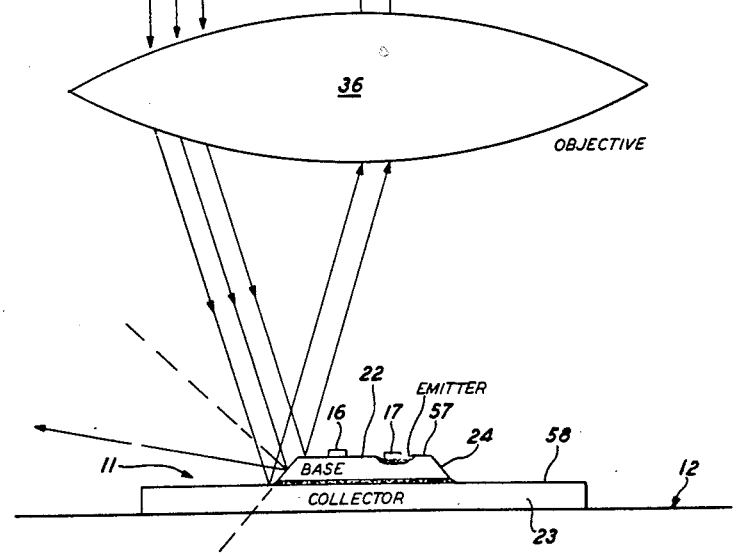
FIG. 5 is an elevation illustrating the pattern of light reflection from a semiconductive mesa and its slopes.

The manner in which positioning information is extracted from the image projected into the eyepiece 41 is best described with reference to FIGS. 5, 6 and 7. FIG. 5 is an enlarged view illustrating the optics involved in producing an image of the semiconductive wafer 11. It will be seen that the wafer 11 is divided into a mesa portion 22 which rises up from a bottom portion 23. Such configuration is often employed in order to obtain desirable electrical characteristics. The mesa 22 ordinarily has a flat top surface 57, the sides of the mesa sloping outwardly from this surface to a parallel top surface 58 of the bottom portion 23. Thus, in illuminating the wafer 11, most of the incident rays of light passing through the objective lens 36 which impinge on the top surfaces 57 and 58 may be directed so as to be reflected back into the objective lens. On the other hand, most of the incident light rays which impinge on the sloping sides 24 of the mesa 22 are scattered and do not return to the objective lens. The resultant image projected into the eyepiece 41 is one of marked contrast wherein the top surfaces 57 and 58 appear as bright areas, while the sloping sides 24 of the mesa 22 appear as a dark boundary surrounding the surface 57.

The invention utilizes these areas of marked contrast to provide the desired positioning information. It should be noted that since contrast is utilized, a dark field method wherein the sloping sides 24 of the mesa 22 appear as a bright boundary between dark surfaces is just as effective. Furthermore, any suitable areas which provides both contrast and positioning information may be utilized, the sloping sides of the mesa being selected because of their particular convenience.

Figure 6:
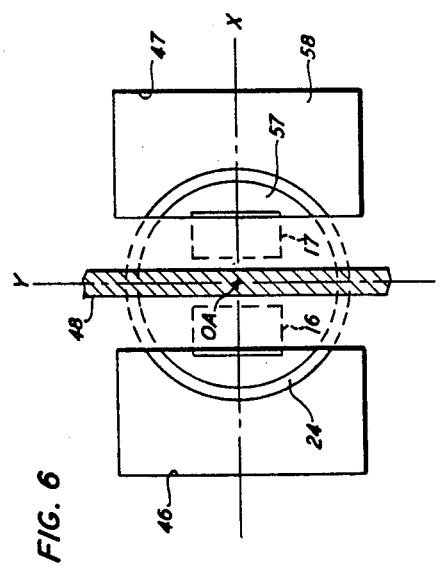
Figure 7:
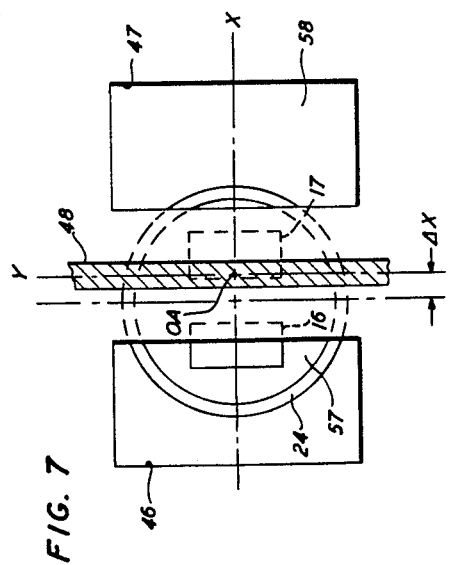

The image projected into the eyepiece 41 is illustrated in FIGS. 6 and 7 as seen through the windows 46 and 47 of the compartment 43. In FIG. 6, the transistor 10 is in a position such that the imaginary plane P bisects the mesa 22. In such position, substantially equal portions of the boundary 24 appear through the windows 46 and 47. The result is that substantially the same amount of light passes through each of the windows from the image projected into the eyepiece 41.

This condition is disturbed with displacement ($\Delta X$) of the transistor 10, as shown in FIG. 7. There, the mesa 22 is no longer bisected by the imaginary plane P so that unequal portions of the boundary 24 are viewed through each window. Since there is less reflecting area under the window 46 than under the window 47 in the case illustrated, this results in the passage of less light through the window 46 than through the window 47. Displacement of the transistor 10 from the position of FIG. 6 in a direction opposite to that shown in FIG. 7 would, of course, result in the passage of less light through the window 47 than through the window 46. Furthermore, it is readily seen that the magnitude of the difference in the amount of light passing through each window is a function of the extent ($\Delta X$) to which the transistor 10 is displaced from the position of FIG. 6.

The photoelectric elements 49 and 50 operate to translate these variations in light passing through the windows into electrical signal parameters indicative of the direction and degree of displacement of the transistor 10. To accomplish this, the photoelectric elements are connected in the bridge circuit of FIG. 4, for example. This bridge circuit comprises a reference voltage source, battery 60, connected across two identical parallel arms. Each arm contains a different one of the photoelectric elements, 49 and 50, respectively, and resistive elements 61 and 62 respectively. A terminal, A and B respectively, is connected to each of the junctions between the photoelectric and resistive elements, one of these junctions being grounded.

With no light incident on either of the photoelectric elements, the current flow in each of the identical parallel arms should be equal. Thus the voltage at each of the junctions should be equal and no voltage difference should appear across the terminals A and B. A practical circuit, however, does not approach this ideal due to tolerances, and the like. Therefore, a variable resistor 25 is advantageously included in the bridge to permit adjustment to an initial balanced condition.

Such condition is not disturbed when the transistor 10 is positioned as in FIG. 6. In that position, equal amounts of light pass through the windows 46 and 47 onto the photoelectric elements 49 and 50, so that the current flow in each of the parallel arms of the bridge circuit remains equal and no voltage difference appears across the terminals A and B.

Displacement of the transistors 10 from the position of FIG. 6, however, upsets this balanced condition. For example, when the transistor 10 is positioned as in FIG. 7, less light passes through the window 46 onto the photoelectric element 49 than through the window 47 onto the photoelectric element 50. This causes less current to flow through the parallel arm of the terminal A than through the parallel arm of the terminal B. As a result, the voltage at the terminal A is less than the voltage at the terminal B and a voltage difference appears across the terminals. Conversely, displacement of the transistor 10 from the position of FIG. 6 in a direction opposite to that shown in FIG. 7 causes more current to flow through the parallel arm of the terminal A than through the parallel arm of the terminal B. As a result, the voltage at the terminal A becomes greater than the voltage at the terminal B and, again, a voltage difference appears across the terminals. It will be noted that the polarity of the voltage appearing across the terminals A and B depends upon the direction in which the transistor 10 is displaced from its position in FIG. 6.

In this way, an electrical signal is produced at the terminals A and B having parameters which are indicative of the direction and degree of displacement of the transistor 10 from the position of FIG. 6. This signal may, therefore, be used to properly direct the mechanical output of the servo network associated with the compartment 43.

Figure 4:
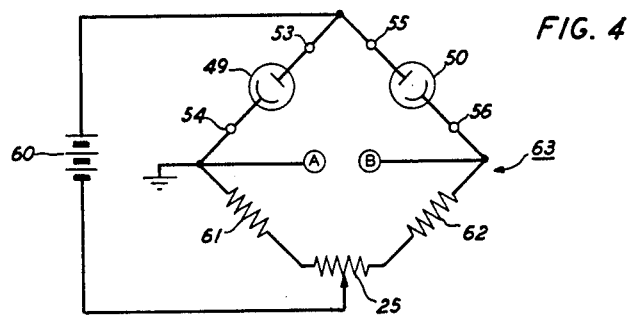
FIG. 4 is a circuit diagram of a bridge circuit forming part of the system of FIG. 2.

In FIG. 2, the bridge circuit of FIG. 4 is represented by a block 63 having the output terminals 53, 54 and 55, 56 of the photoelectric devices 49 and 50 connected thereto. The remainder of the servo network is also represented by blocks since it is composed of standard electrical units. The output at the terminals A and B is connected through a combining network 64 to a chopper amplifier 65. The amplifier 65 converts the D.C. signal out of the circuit 63 into an A.C. signal which retains in its parameters of phase and amplitude the information relative to direction and degree of displacement, respectively, found in the D.C. signal. To this end, the A.C. signal output of the amplifier 65 is made to either lead or lag by 90° a reference A.C. voltage applied from a source 67 in accordance with the polarity of the applied D.C. signal.

The A.C. voltages out of the amplifier 65 and the source 67 are applied to an electric motor 66 of the two-phase type. The direction in which the motor 66 rotates and the speed of its rotation are, therefore, determined by the phase and magnitude, respectively, of the A.C. signal out of the amplifier 65. The rotational output of the motor 66 is then translated through a gear box 68 and the shaft 34 into lineal displacement of the chuck 32, the direction and speed of lineal displacement being dependent upon the direction and speed of rotation of the shaft 34.

It should be noted that a portion of the rotational output of the motor 66 is applied to a tachometer generator 69 which produces an electrical signal indicative of its speed and direction. This electrical signal is then fed back to the combining network 64. Such feedback is conventionally employed in servo networks and acts as a damping agent to prevent excessive positioning overshoot and to reduce deadband.

It is thus seen that the electro-optical servo system of FIG. 2 extracts positioning information from an optical image of the transistor 10 and converts this positioning information into electrical signals which then control mechanical apparatus for positioning the transistor. This system may readily be adapted to automatically position the transistor 10 for the bonding operation in its manufacture by establishing the optical axis OA of the microscope 35 as a reference for a bonding tool. Initial approximate orientation of the transistor 10 relative to this optical axis may be accomplished in a conventional manner well enough to position the transistor 10 within viewing range of the microscope 35. The electro-optical servo system of the invention may then be utilized to accurately position the transistor 10 with reference to the optical axis.

In the embodiment of FIG. 2, this is done by taking the center of the mesa 22 as a reference and translating the transistor 10 in X and Y directions until this center point is positioned in coincidence with the microscope's optical axis. To this end, a coordinate system is selected, the X and Y axes of which intersect at the optical axis. As shown in FIGS. 6 and 7, the eyepiece 41 may then be utilized to translate the center point of the mesa 22 to a zero X coordinate by establishing the imaginary plane P in coincidence with the Y axis of the selected coordinate system.

For example, the image projected into the eyepiece 41 may initially be like that illustrated in FIG. 7, depending, of course, upon the direction and degree of displacement ($\Delta X$) of the transistor 10 from the Y axis in the X direction. Assuming such an image, an electrical voltage difference is established between the terminals A and B of the bridge circuit 63 in the servo network, the polarity and magnitude of which control the rotational direction and speed of the motor 66. The rotational output of the motor 66 is then converted through the gear box 68 and the shaft 34 into lineal translation of the chuck 32 in the X direction. The direction of translation of the chuck 32 is determined by the rotational direction of the motor 66 or, more fundamentally, the polarity of the voltage difference across the terminals A and B. Furthermore, given a polarity, the rotational direction of the shaft 34 is selected so that the chuck 32 is translated in a direction which tends to eliminate the voltage difference causing such translation. Thus, in the given example, the chuck 32 is caused to move in the direction which tends to change the position of the image projected into the eyepiece 41 from that of FIG. 7 to that of FIG. 6. When the image reaches the position of FIG. 6, the balanced network 63 no longer produces a voltage output across the terminals A and B and, consequently, motion of the chuck 32 is halted. In this way, the center of the mesa 22 is accurately positioned in the Y axis of the selected coordinate system.

Figure 8:
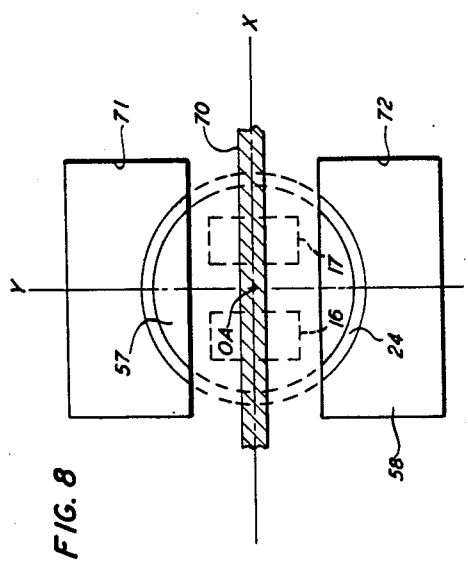
FIGS. 6–9 are enlarged images of properly and improperly positioned semiconductive mesas as they appear within a transducer compartment.
Figure 9:
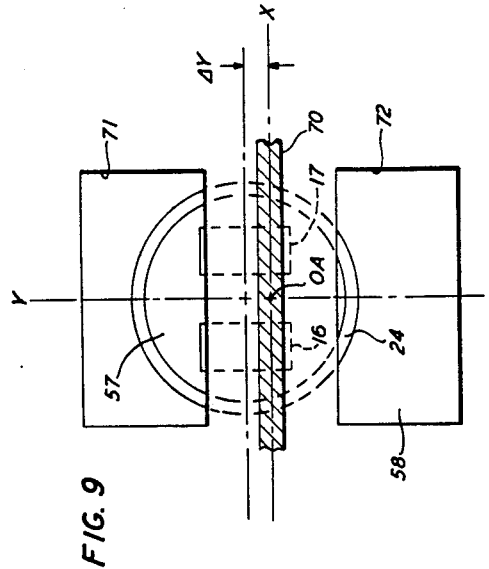

Accurate positioning of the center of the mesa 22 to a zero Y coordinate is accomplished in much the same manner by means of the eyepiece 40. The same image projected into the eyepiece 41 is also projected into eyepiece 40. The compartment 42 surmounting the eyepiece 40 differs from the compartment 43 (FIG. 3), however, but only in the respect that the compartment 42 is oriented at 90° with respect to the orientation of the compartment 43. Thus, referring to FIG. 8, the compartment 42 includes a wall 70 which is coincident with the X axis of the selected coordinate system. For that reason, the compartment 42 is capable of detecting any displacement (ΔY in FIG. 9) of the center of the mesa 22 in the Y direction from the optical axis. Such displacement would produce an inequality in the amount of light passing through the windows 71 and 72 of the compartment 42. This inequality would be converted through a bridge circuit 73, a combining network 74, a chopper amplifier 75, a motor 76, a gear box 77, and the shaft 33 into the Y direction linear translation of the chuck 32 required to bring the center of the mesa 22 into coincidence with the X axis of the selected coordinate system.

Thus, the embodiment of FIG. 2 establishes as a reference norm the amount of light passing through each compartment window when the transistor 10 is positioned in a known location within a preselected coordinate system, converts the amount of light passing through each window into an electrical signal indicative of that amount, thereby establishing an electrical reference norm corresponding to the light reference norm, and utilizes variations in this electrical reference norm to position the transistor 10. Once the transistor 10 is in this known location, it becomes a relatively simple matter to position a bonding tool in proper relationship to the transistor within the established coordinate system.

It will be noted that some elements of inaccuracy are present in the positioning system above described. First, the apparatus of FIG. 2 will bring the transistor 10 to rest at that X position where equal areas of the boundary 24 appear through the windows 46 and 47, and at that Y position where equal areas of the boundary 24 appear through the windows 71 and 72. Due to irregularities in the boundary 24, this ultimate position of the transistor 10 is not necessarily one where the center of the mesa 22 coincides exactly with the optical axis of the microscope 35. The best that can be expected is approximate coincidence. Second, the purpose of the positioning operation is to locate a bonding tool relative to the points on a semiconductor mesa to which conductive leads are to be bonded. For example, in FIG. 1, the bonding tool 19 must be located above the metallic stripes 16 and 17 to effect the bonding operation. The center of the mesa 22 is only an approximate guide to the location of these stripes.

Accordingly, in the present embodiment, the sloping sides of the mesa 22 are utilized for the purpose of effecting coarse positioning of the transistor 10 in order to bring the metallic stripes 16 and 17 within view of a high magnification lens system. The lower magnification objective lens 36 (FIG. 2) is utilized initially to provide an image which encompasses the boundary 24 of the mesa 22 plus a reasonable working area. Once the transistor 10 is coarsely positioned by means of this image, the turret 38 is swiveled to replace the lens 36 with the higher magnification objective lens 37. The lens 37 projects an enlarged image of the metallic stripes 16 and 17 into both of the eyepieces 40 and 41. FIGS. 10 and 11 illustrate such an image as seen through the windows 46 and 47 of the compartment 43. Since more light is reflected from the metallic stripes 16 and 17 than from the mesa surface 57, the image projected into the eyepiece 43 again provides a contrasting geometrical pattern which may be utilized to position the transistor 10.

The coarse positioning initially provided may produce an image which is displaced in the X direction, as shown in FIG. 11. With such an orientation, less light passes through the window 47 than through the window 46. This, again, produces an electrical voltage difference between the output terminals A and B of the bridge circuit 63 which may be converted through the servo network into lineal translation of the chuck 32 in such a direction as to move the image projected into the eyepiece 41 to the position shown in FIG. 10; that is, to a position where the amount of light passing through each window is equal, whereby the voltage difference between the terminals A and B is cancelled. Furthermore, as illustrated in FIGS. 12 and 13, the image seen through the windows 71 and 72 may be utilized to more accurately position the metallic stripes 16 and 17 in the Y direction. In this way, the metallic stripes 16 and 17 may be finely positioned with reference to the coordinates of the optical axis of the microscope 35 and the bonding tool employed may be accurately directed to their location.

It should be noted that a shift of the transistor 10 to the left in the X direction, for example, when the boundary 24 is being used as a reference (FIG. 7) will produce more light in the window 47 than in the window 46, while a shift in the same direction when the metallic stripes 16 and 17 are being used as references (FIG. 11) will produce less light in the window 47 than in the window 46. This is due to the fact that a reference darker than its background is used in the former instance, while a reference brighter than its background is used in the latter. Therefore, in order that the chuck 32 be translated in the proper direction, means should be provided to compensate for this effect whenever the objective lenses 36 and 37 are interchanged. Such means may take the form, for example, of a switching circuit 78 (FIG. 2) which is mechanically actuated by the swivelling of the turret 38 to reverse the polarity of the voltage appearing across the terminals A and B.

A similar switching circuit 79 should also be provided in the servo network associated with the compartment 42. Of course, the present invention contemplates that the steps of coarse and fine positioning might be accomplished by separate servo systems utilizing separate microscopes, in which event objective lens interchange would not be employed.

Figure 14:
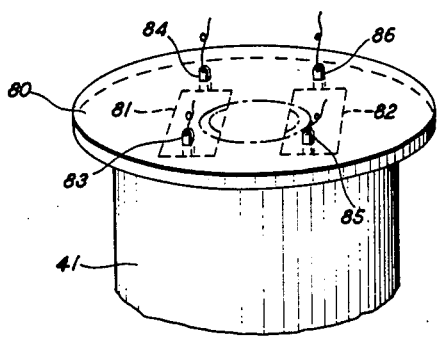
FIG. 14 is a schematic view illustrating a transducer arrangement alternative to that of FIG. 3.

The compartment type transducer illustrated in FIG. 3 utilizes its windows as a means for defining the shapes of the image portions projected onto the photoelectric elements contained therein. Such shaping, while not necessary to the invention, increases the positioning accuracy of the system. Means other than a compartment structure may be employed to provide shaping. For example, it has been noted that the photoelectric elements 49 and 50 may take the form of photosensitive resistors. A photosensitive resistor changes its resistive value in accordance with the amount of light incident thereon. Such a resistor may be provided in the form of a coating of photosensitive material on an insulating base. Therefore, as seen in FIG. 14, the eyepiece 41, for example, may be surmounted by a plate 80 of insulating material having photosensitive material coated thereon to form photosensitive resistors 81 and 82. Terminals 83 and 84 for the resistor 81, and terminals 85 and 86 for the resistor 82 are provided. The configuration and placement of the elements 81 and 82 may be made to coincide with those of the windows 46 and 47. Thus, for the same position of the transistor 10, corresponding portions of the image in the tube 41 will be projected onto the photosensitive resistors 81 and 82 as were projected through the windows 46 and 47, respectively. Positioning information may therefore be derived from the relative values of the resistive elements.

It is to be understood that the above-described embodiments are simply illustrative of the application of the principles of the invention. Numerous other arrangements may be devised by those skilled in the art which will embody the principles of the invention and fall within the spirit and scope thereof.

What is claimed is:

1. An electro-optical servo system for positioning in a selected location and illuminated body having a surface comprising at least two areas of contrasting brightness, said system comprising a microscope focused upon said surface and adapted to produce an enlarged image including said areas, at least two photoelectric elements, means for projecting a distinct geometrical portion of said image onto each of said elements respectively, said portions each comprising at least a segment of each of said areas of contrasting brightness, the amount of light projected onto each of said elements being established as a light reference norm when said body is in said selected location so as to align various ones of said segments with respect to said means for projecting, each of said elements being adapted to produce an electrical signal which is a function of the amount of light incident thereon, so that displacement of said areas from said selected location produces variation in the signal outputs of said photoelectric elements from an electrical reference norm corresponding to said light reference norm, and servo means for moving said body into said selected location in response to variation of said signal outputs from said electrical reference norm.

2. An electro-optical servo system for positioning in a selected location an illuminated body having a surface comprising at least two areas of contrasting brightness, said system comprising a microscope focused upon said surface and adapted to produce an enlarged image including said areas, a pair of photoelectric elements, means for projecting a distinct geometrical portion of said image onto each of said elements respectively, said portions being identically shaped and symmetrically disposed on opposite sides of the optical axis of said microscope along an imaginary line intersecting said optical axis, each of said portions comprising at least a segment of each of said areas of contrasting brightness, the amount of light projected onto each of said elements when said illuminated body is in said selected location being established as a light reference norm, such positioning providing a desired orientation between various ones of said segments and said means for projecting, each of said elements being adapted to produce an electrical signal which is a function of the amount of light incident thereon, displacement of said body from said selected location in a direction parallel to said imaginary line producing a variation in the signal output of said photoelectric elements from an electrical reference norm corresponding to said light reference norm, and servo means for moving said body into said selected location in response to variation of said signal outputs from said electrical reference norm.

3. An electro-optical servo system in accordance with claim 2, in which said means for projecting comprises a pair of rectangular apertures for transmitting therethrough rectangular shaped portions of said enlarged image, a selected side of each of said apertures being disposed perpendicularly to said imaginary line.

4. An electro-optical servo system for positioning in a selected location an illuminated body having a surface comprising at least two areas of contrasting brightness, said system comprising a microscope focused upon said surface and adapted to produce an enlarged image including said areas, a substantially light-proof compartment having at least two windows therein, said windows being disposed so that light from a specific geometrical portion of said image passes through each window, respectively, into said compartment, each of said portions comprising at least a segment of each of said areas of contrasting brightness, the amount of light passing through each window being established as a light reference norm when said illuminated body is in said selected location so as to align in a predetermined manner selected ones of said segments with respect to said windows, separate photoelectric elements within said compartment for each one of said windows, each of said elements being positioned so as to receive light from its associated window only and being adapted to produce an electrical signal which is a function of the amount of light incident thereon, so that displacement of said illuminated body from said selected location produces variation in the signal outputs of said photoelectric elements from an electrical reference norm corresponding to said light reference norm, and servo means for moving said illuminated body into said selected location in response to variation of said signal outputs from said electrical reference norm.

5. An electro-optical servo system in accordance with claim 4, in which said windows are identically shaped and symmetrically disposed to either side of the optical axis of said microscope along an imaginary line intersecting said optical axis.

6. An electro-optical servo system in accordance with claim 5, in which said windows are rectangular in shape, a selected side of each being disposed perpendicularly to said imaginary line.

7. An electro-optical servo system for positioning in a selected location an illuminated semiconductive mesa having a surface comprising at least two areas of contrasting brightness one of which is defined by the sloping boundary of said mesa, said system comprising a microscope adapted to produce an enlarged image of said surface including said mesa boundary, a pair of photoelectric elements, means for projecting a distinct geometrical portion of said image onto each of said elements respectively, said portions each comprising at least a segment of each of said areas of contrasting brightness, said portions being identically shaped and symmetrically disposed on opposite sides of the optical axis of said microscope along an imaginary line intersecting said optical axis, the projection of an equal amount of light onto each of said elements being established as a light reference norm when said mesa is in said selected location so as to align selected ones of said segments with respect to said means for projecting, each of said elements being adapted to produce an electrical signal which is a function of the amount of light incident thereon, so that displacement of said semiconductive mesa from said selected location in a direction parallel to said imaginary line produces variation in signal outputs of said photoelectric elements from an electrical reference norm corresponding to said light reference norm, and servo means for moving said semiconductive mesa into said selected location in response to variation of said signal outputs from said electrical reference norm.

8. An electro-optical servo system in accordance with claim 7, characterized in that said means for projecting comprises a pair of rectangular shaped windows, a side of each of which is disposed perpendicularly to said imaginary line.

9. An electro-optical servo system for positioning in a selected location an illuminated semiconductive wafer having a surface comprising areas of contrasting brightness, a pair of metallic strips defining two of said areas, said system comprising a microscope focused upon said surface and adapted to produce an enlarged image including said areas, a pair of photoelectric elements, means for projecting a specific geometrical portion of said image onto each of said elements respectively, each of said portions comprising at least a segment of one of said strips, said portions being identically shaped and symmetrically disposed to either side of the optical axis of said microscope along an imaginary line intersecting said optical axis, the projection of an equal amount of light onto each of said elements being established as a light reference norm when said wafer is in said selected location so that the segment of the metallic strip of each of said areas is aligned with respect to said means for projecting, each of said elements being adapted to produce an electrical signal which is a function of the light incident thereon, so that displacement of said semiconductive wafer from said selected location in a direction parallel to said imaginary line produces variation in the signal outputs of said photoelectric elements from an electrical reference norm corresponding to said light reference norm, and servo means for moving said semiconductive wafer into said selected location in response to variation of said signal outputs from said electrical reference norm.

10. An electro-optical servo system for positioning in a selected location an illuminated body having a surface comprising at least two areas of contrasting brightness, said system comprising a microscope focused upon said surface and adapted to produce an enlarged image including said areas, a first transducer including first and second photoelectric elements, a second transducer including third and fourth photoelectric elements, first means for projecting first and second distinct geometrical portions of said image onto said first and second elements respectively, second means for projecting third and fourth distinct geometrical portions of said image onto said third and fourth elements respectively, said portions each comprising at least a segment of each of said areas of contrasting brightness, said first and second portions being identically shaped and being symmetrically disposed to either side of the optical axis of said microscope along a first imaginary line passing through said optical axis, said third and fourth portions being identically shaped and being symmetrically disposed to either side of the optical axis of said microscope along a second imaginary line passing through said optical axis, said first and second imaginary lines being perpendicular to each other, the amount of light projected onto each of said first and second elements being established as a first light reference norm when said body is in said selected location so as to align selected ones of said segments of said first and second portions with respect to said first means for projecting, the amount of light projected onto each of said third and fourth elements being established as a second light reference norm when said body is in said selected location so as to align selected ones of said segments of said third and fourth portions with respect to said second means for projecting, each said element being adapted to produce an electrical signal which is a function of light incident thereon, so that displacement of said illuminated body from said selected location in a direction parallel to said first imaginary line produces a variation in the signal outputs of said first and second photoelectric elements from a first electrical reference norm corresponding to said first light reference norm, while displacement of said illuminated body from said selected location in a direction parallel to said second imaginary line produces a variation of the signal outputs of said third and fourth photoelectric elements from a second electrical reference norm corresponding to said second light reference norm, first servo means for moving said illuminated body in a direction parallel to said first imaginary line into said location in response to variation of the signal outputs of said first and second photoelectric elements from said first electrical reference norm and second servo means for moving said illuminated body in a direction parallel to said second imaginary line into said selected location in response to variation of the signal outputs of said third and fourth photoelectric elements from said second electrical reference norm.

11. A photo-optical servo system for coarse and fine positioning in a selected location an illuminated semiconductive mesa having a surface comprising areas of contrasting brightness, one of said areas being defined by the sloping boundary of said mesa while a pair of metallic strips on said mesa define other ones of said areas, said system comprising a microscope having a low magnification lens system for producing an enlarged image including said mesa boundary and a high magnification lens system for producing an enlarged image including said metallic strips, means associated with said microscope for switching from one to the other of said lens systems to produce one or the other of said images, a pair of photoelectric elements, means for projecting a distinct geometrical portion of the image produced by either one of said lens systems onto each said element respectively, said portions each comprising at least a segment of said two areas of contrasting brightness, said portions being identically shaped and symmetrically disposed to either side of the optical axis of said microscope along an imaginary line intersecting said optical axis, the projection of an equal amount of light onto each of said elements being established as a light reference norm when said mesa is in said selected location so as to align selected ones of said segments with respect to said means for projecting, each said element being adapted to produce an electrical signal which is a function of the amount of light incident thereon, so that displacement of said semiconductive mesa from said selected location in a direction parallel to said imaginary line produces variations in the signal outputs of said photoelectric elements from an electrical reference norm corresponding to said light reference norm, and servo means for moving said semiconductive mesa into said selected location in response to variation of said signal outputs from said electrical reference norm.

References Cited in the file of this patent

UNITED STATES PATENTS

| | | |
|---|---|---|
| 1,582,702 | Stoekle et al. | Apr. 27, 1926 |
| 2,086,153 | Bickel | July 6, 1937 |
| 2,462,925 | Varian | Mar. 1, 1949 |
| 2,513,367 | Scott | July 4, 1950 |
| 2,851,643 | Limberger | Sept. 9, 1958 |
| 2,882,420 | Koulicovitch | Apr. 14, 1959 |
| 2,921,757 | Houle | Jan. 19, 1960 |
| 2,925,464 | Raible | Feb. 16, 1960 |